United States Patent Office 3,103,520
Patented Sept. 10, 1963

3,103,520
AMINOBENZOXACYCLOALKANES
Harold Elmer Zaugg, Lake Forest, Robert William De Net, Waukegan, and Raymond John Michaels, Jr., Mundelein, Ill., assignors to Abbott Laboratories, Chicago, Ill., a corporation of Illinois
No Drawing. Filed June 8, 1961, Ser. No. 115,607
12 Claims. (Cl. 260—333)

This invention is directed to aminobenzoxacycloalkanes of the formula

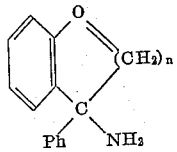

and acid-addition salts thereof as well as to methods for their preparation. In this and succeeding formulae, Ph is phenyl and n is 1, 2 or 3. These compounds in their free base form are colorless liquids and can be readily isolated as such or as crystalline solids in the form of their hydrochlorides, hydrobromides, oxalates, benzoates and the like. They are useful as analgesics, antispasmodics, local anesthetics and hypotensive agents. For such use, the compounds and their acid-addition salts can be employed orally, intravenously or intramuscularly alone or admixed with a non-toxic, pharmaceutical liquid or solid carrier and administered in the form of tablets, solutions, suspensions or emulsions. In an actual test, one milliliter of a 1% aqueous saline solution of 5-amino-5-phenyl-2,3,4,5-tetrahydro-1-benzoxepin hydrochloride injected adjacent the sciatic nerve of a guinea pig produced nerve block causing sensory anethesia to a portion of the pig's leg for about one hour. In another test, an intravenous injection of an aqueous saline solution of 4-amino-4-phenylchroman in cats at a dosage of 25 mg. per kg. of body weight produced an immediate marked drop in blood pressure.

The aminobenzoxacycloalkanes comprising this invention are prepared by reacting an excess of ethereal liquid ammonia with a carboxylyl chloride of the formula

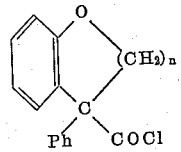

at or about room temperature to form an intermediate carboxamide of the formula

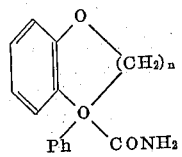

This intermediate is then refluxed with an alkali metal hypobromite in a methanolic medium to obtain an intermediate carbamate of the formula

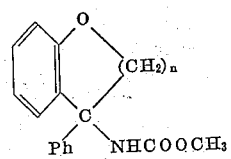

which is thereafter refluxed with an alkali metal hydroxide in an aqueous ethanol medium to obtain the desired aminobenzoxacycloalkanes. If desired, 3-amino-3-phenyl-2,3-dihydrobenzofuran and 4-amino-4-phenylchroman can be prepared directly from the corresponding intermediate carboxamides by treatment with an aqueous solution of an alkali metal hypobromite at from 5° C. to about 60° C.

The acid-addition salts of the compounds of this invention are prepared in the usual manner by the reaction of the free bases with an acid in an inert organic solvent, such as ether and separating the acid-addition salt which precipitates by filtration.

The following examples illustrate the invention but are not to be considered as the sole embodiments thereof.

EXAMPLE 1

*Preparation of Intermediate Carboxamides*

(a) 3 - phenyl - 2,3-dihydro-3-benzofurancarboxamide was prepared as follows: A solution of 7.2 g. (0.03 mole) of 3-phenyl-2,3-dihydro-3-benzofurancarboxylic acid (M.P.=125° C.) in 40 ml. of dry benzene containing 5.4 g. (0.04 mole) of thionyl chloride was refluxed for 3 hours. The benzene and excess thionyl chloride were removed by distillation at reduced pressure, the residual oil was taken up in 30 ml. of dry ether and was added rapidly to a solution of 50 ml. of liquid ammonia in 200 ml. of dry ether. The mixture was stirred for 3 hours and then allowed to stand for 3 days. Evaporation of the reaction mixture to dryness gave a solid residue which was treated with a mixture of chloroform and water. The chloroform layer was separated and concentrated to dryness. Recrystallization of the dry residue from ethanol gave the desired carboxamide which melted at 158°–159° C. and contained 5.94% nitrogen compared to the theoretical value of 5.86% nitrogen.

(b) 4-phenyl-4-chromancarboxamide was prepared in the same manner by the reaction of 51.2 g. (0.2 mole) of 4-phenyl-4-chromancarboxylic acid (M.P.=152° C.) and 29.8 g. (0.25 mole) of thionyl chloride and further reaction of the acid chloride thus formed with 450 ml. of liquid ammonia. M.P.=180°–182° C.

N (calcd.)=5.53%; N (found)=5.57%

(c) 5 - phenyl-2,3,4,5-tetrahydro-1-benzoxepin-5-carboxamide melting at 154°–155° C. was prepared by the foregoing procedure by the reaction of the corresponding acid chloride and ammonia. N (calcd.)=5.24%; N (found)=5.24%.

EXAMPLE 2

*Preparation of Intermediate Carbamates From Carboxamides*

(a) Methyl 3 - phenyl-2,3-dihydro-3-benzofurylcarbamate was prepared as follows: To a solution of 6.1 g. (0.025 mole) of 3-phenyl-2,3-dihydro-3-benzofurancarboxamide and 0.05 mole of sodium methoxide in 100 ml. of dry methanol was added dropwise with stirring 4.3 g. (0.027 mole) of bromine. The mixture was then refluxed for 2 hours and thereafter allowed to stand overnight at room temperature. The solvent was removed by distillation, the residue taken up in ether, washed with water, dried and recovered from the ether again by concentration. After recrystallization from methylcyclohexane, the desired carbamate was obtained as a white solid melting at 115°–116° C. and contained 5.19% nitrogen which corresponded to the calculated value for nitrogen.

(b) Methyl-4-phenyl-4-chromancarbamate is prepared in the same manner by substituting 4-phenyl-4-chromancarboxamide for the 3-phenyl-2,3-dihydro-3-benzofurancarboxamide in the foregoing procedure.

(c) Methyl 5-phenyl-2,3,4,5-tetrahydro-1-benzoxepinyl-5-carbamate was prepared by refluxing a solution of 10 g.

(0.037 mole) of the corresponding carboxamide (prepared in part (c) of Example 1), 0.082 mole of sodium methoxide in 150 ml. of methanol and 6.1 g. (0.038 mole) of bromine and thereafter processing the reaction mixture by evaporation of the solvent and recrystallization of the residue from cyclohexane. The carbamate melted at 110°–111° C. N (calcd.)=4.71%; N (found)=4.65%.

EXAMPLE 3

*Direct Preparation of Amino Compounds From Carboxamides*

(a) 3-amino-3-phenyl-2,3-dihydrobenzofuran was prepared as follows: To a cold (5° C.) suspension of 6.1 g. (0.025 mole) of 3-phenyl-2,3-dihydro-3-benzofurancarboxamide in 45 ml. of water was added dropwise with stirring over a period of 15 minutes a solution of potassium hypobromite freshly prepared by the addition of 4.3 g. (0.027 mole) of bromine to 45 ml. of water containing 8.4 g. (0.15 mole) of KOH. Following the addition, the mixture was stirred at room temperature for 2 hours during which time a clear yellow solution formed. Heating on the steam bath for 30 minutes precipitated an oil. After cooling, the mixture was acidified with HCl, insoluble material was removed by ether extraction and the aqueous layer was made alkaline by the addition of 40% aqueous NaOH. The liberated oil was taken up in ether, dried and distilled to yield the desired amino product which boiled at 139°–140° C. at 1.5 mm. pressure. $n_D^{25}=1.6078$. The hydrochloride salt of the free base was readily prepared by treatment of the base with ethereal hydrogen chloride at room temeprature. M.P.=176° C.; N (calcd.)=5.66%; N (found)=5.61%.

(b) 4-amino-4-phenylchroman was prepared as in the foregoing procedure by treatment of 38.5 g. (0.15 mole) of 4-phenyl-4-chromancarboxamide with aqueous potassium hypobromite. B.P.=154°–155° C. at 1.5 mm. pressure; $n_D^{25}=1.6112$. The reaction of the free base with ethereal hydrogen chloride produced the desired HCl salt which melted at 229°–230° C. and contained 5.47% nitrogen compared to the calculated value of 5.35% nitrogen.

EXAMPLE 4

*5-Amino-5-Phenyl-2,3,4,5-Tetrahydro-1-Benzoxepin Hydrochloride*

A solution of 8 g. (0.026 mole) of the corresponding carbamate (prepared in part (c) of Example 2) in 150 ml. of 80% aqueous ethanol containing 15 g. of KOH was refluxed for 16 hours. After removal of the solvent by distillation, the residue was taken up in ether, washed with water and dried. Treatment of the dried ethereal solution with a slight excess of ethereal hydrogen chloride precipitated the desired HCl salt which after recrystallization from an ethanol-ether mixture melted at 207°–208° C. Upon analysis, this salt was found to contain 5.14% nitrogen whereas the calculated value for nitrogen was 5.08%.

In a similar fashion, 3-amino-3-phenyl-2,3-dihydrobenzofuran and 4-amino-4-phenylchroman are prepared by refluxing methyl 3-phenyl-2,3-dihydro-3-benzofurylcarbamate or methyl 4-phenyl-4-chromancarbamate, respectively, in an aqueous alcoholic solution containing an alkali metal hydroxide.

The carboxylic acids employed as starting materials in the present invention are prepared by refluxing equimolecular proportions of the sodium derivative of 3-phenyl-2-benzofuranone and a dihaloalkane of the formula $X-(CH_2)_n-X$ wherein each X is chlorine or bromine in the presence of an inert organic solvent. After filtering the reaction mixture, the filtrate is concentrated and the residue distilled or crystallized to obtain the intermediate 3-haloalkyl-3-phenyl-2-benzofuranones which are thereafter refluxed with an alkali metal hydroxide in an alcoholic or aqueous medium. The reaction mixture is then acidified to precipitate the desired carboxylic acid which if desired is crystallized from a suitable organic solvent. 5-phenyl-2,3,4,5-tetrahydro-1-benzoxepin-5-carboxylic acid is a crystalline solid melting at 184° C.

What we claim is:
1. 3-amino-3-phenyl-2,3-dihydrobenzofuran.
2. 4-amino-4-phenylchroman.
3. 5-amino-5-phenyl-2,3,4,5 - tetrahydro-1-benzoxepin hydrochloride.
4. A method for the preparation of a compound of the formula

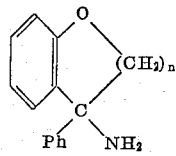

wherein Ph is phenyl and $n$ is a whole number from 1 to 3 inclusive which comprises reacting at least one molecular proportion of liquid ammonia in an ether medium with one molecular proportion of a compound of the formula

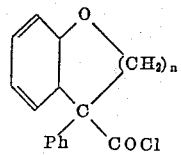

at about room temperature to form an intermediate of the formula

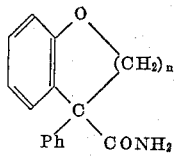

which is refluxed with an equivalent amount of an alkali metal hypobromite in methanol to form a second intermediate of the formula

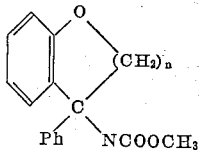

thereafter refluxing said second intermediate with an alkali metal hydroxide in aqueous methanol and separating the resulting product from the reaction mixture.

5. A method for the preparation of 3-amino-3-phenyl-2,3-dihydrobenzofuran which comprises reacting at room temperature one molecular proportion of 3-phenyl-2,3-dihydro-3-benzofurancarbonyl chloride with at least one molecular proportion of liquid ammonia in ether to form 3-phenyl-2,3-dihydro-3-benzofurancarboxamide, refluxing equimolecular proportions of said carboxamide and sodium hypobromite in methanol to form methyl 3-phenyl-2,3-dihydro-3-benzofurylcarbamate and thereafter refluxing equimolecular proportions of said carbamate and potassium hydroxide in aqueous ethanol.

6. A method for the preparation of 4-amino-4-phenylchroman which comprises reacting at room temperature one molecular proportion of 4-phenyl-4-chromancarbonyl chloride with at least one molecular proportion of liquid ammonia in ether to form 4-phenyl-4-chromancarboxamide, refluxing equimolecular proportions of said carboxamide and sodium hypobromite in methanol to form methyl 4-phenyl-4-chromancarbamate and thereafter refluxing equimolecular proportions of said carbamate and potassium hydroxide in aqueous ethanol.

7. A method for the preparation of 5-amino-5-phenyl-2,3,4,5-tetrahydro-1-benzoxepin which comprises reacting at room temperature one molecular proportion of 5- phenyl - 2,3,4,5-tetrahydro-1-benzoxepin-5-carbonyl chloride with at least one molecular proportion of liquid ammonia in ether to form 5-phenyl-2,3,4,5-tetrahydro-1-benzoxepin-5-carboxamide, refluxing equimolecular proportions of said carboxamide and sodium hypobromite in methanol to form methyl 5-phenyl-2,3,4,5-tetrahydro-1-benzoxepinyl-5-carbamate and thereafter refluxing equimolecular proportions of said carbamate and potassium hydroxide in aqueous ethanol.

8. A method for the preparation of 3-amino-3-phenyl-2,3-dihydrobenzofuran which comprises reacting at from 5° to 60° C. equimolecular proportions of 3-phenyl-2,3-dihydro-3-benzofurancarboxamide and potassium hypobromite in an aqueous medium and recovering the resulting product from the reaction mixture.

9. A method for the preparation of 4-amino-4-phenylchroman which comprises reacting at from 5° to 60° C. equimolecular proportions of 4-phenyl-4-chromancarboxamide and potassium hypobromite in water and recovering the resulting product from the reaction mixture.

10. The hydrochloride salt of 3-amino-3-phenyl-2,3-dihydrobenzofuran.

11. The hydrochloride salt of 4-amino-4-phenylchroman.

12. A member of the group consisting of a compound of the formula

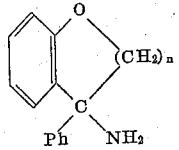

and non-toxic, acid-addition salts thereof wherein Ph is phenyl and $n$ is a whole number from 1 to 3 inclusive.

No references cited.